Dec. 25, 1934.  C. F. JENKINS  1,985,679
AXLE GENERATOR WITH EXCITER
Filed July 7, 1932
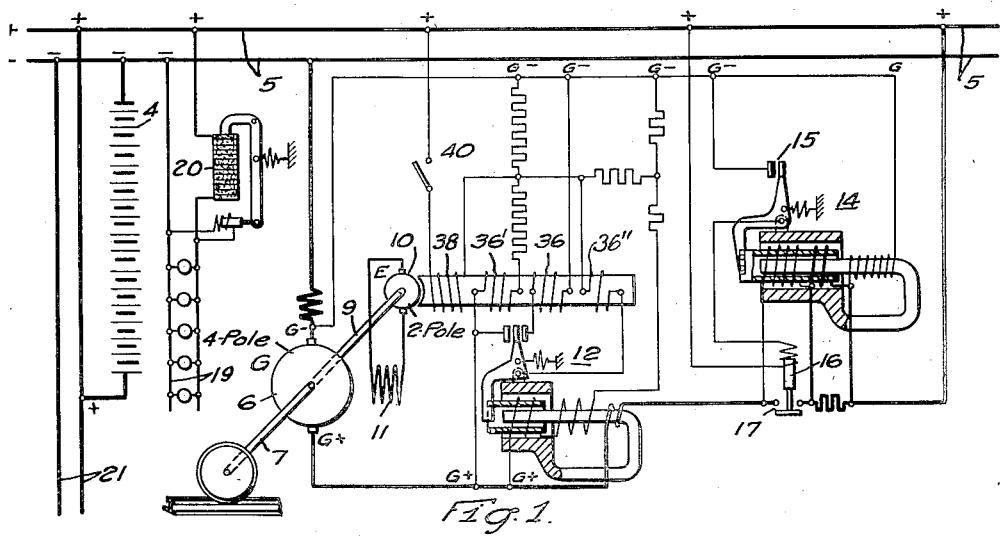
Fig. 1.
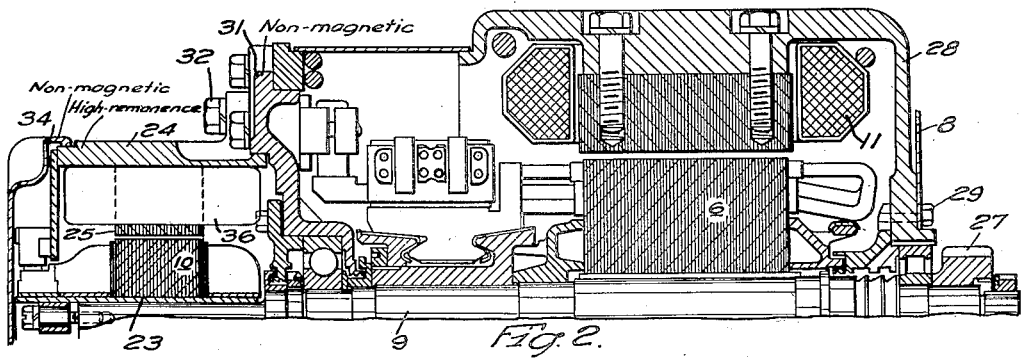
Fig. 2.
WITNESSES:
INVENTOR
Charles F. Jenkins
BY O. B. Buchanan
ATTORNEY
Fig. 3.

Patented Dec. 25, 1934

1,985,679

UNITED STATES PATENT OFFICE 1,985,679

AXLE GENERATOR WITH EXCITER

Charles F. Jenkins, Forest Hills, Pa., assignor to Westinghouse Electric & Manufacturing Company, East Pittsburgh, Pa., a corporation of Pennsylvania Application July 7, 1932, Serial No. 621,161

12 Claims. (Cl. 171—313)

My invention relates to the self-generated electric supply system for a railway car and it has particular relation to a supply system for an air-conditioned railway car having a mechanical refrigerating system driven by an electric motor of considerable capacity, for conditioning or refrigerating the air in the car.

The principal object of my invention is to provide an axle-driven generator having an exciter attached thereto, operating in conjunction with a storage battery on the car.

A more particular object of my invention is to provide means, including a high-remanence exciter field circuit or a "teaser" coil on the exciter field member, or both, for avoiding the necessity for a "reverser" or pole-changing device for causing the axle-driven generator to build up with the same polarity at all times, regardless of the direction of rotation.

In car-lighting systems which have been in use for many years, axle-driven generators have been used in connection with storage batteries, but the generators have been of relatively small capacity, the largest ones ever built being of 4½ kilowatts capacity. These generators have been mounted on the car body, as distinguished from the car truck, and have been driven by means of rubber belts passing over one of the car axles.

My invention has been developed for the purpose of making it possible to supply a 15-kilowatt axle-driven generator which is of such large capacity that, with the necessary belt speed-reduction devices to obtain a sufficiently high generator-speed to hold the generator size down within reasonable limits, would require in all some eight or ten belts, or even more, which would not only overtax the available space but would present a rather formidable cost and maintenance problem. It has been necessary, therefore, to design a generator which could be mounted directly on a truck of the railroad car, the generator being driven by geared speed-reduction devices whereby the necessary high speed of the generator could be obtained with a mechanism which is quiet, relatively efficient, and compact. The details of the gear drive and the generator mounting on the truck constitute the subject-matter of an application of W. A. Brecht, Serial No. 648,203, filed December 21, 1932, for Railway axle generators, assigned to the Westinghouse Electric and Manufacturing Company.

With the innovations just mentioned, rather formidable problems have been presented in connection with the maintenance of the correct generator polarity regardless of the direction of generator rotation. In previous car-lighting systems utilizing axle-driven generators mounted directly on the car body, it has been the standard practice, for many years, to utilize a so-called "reverser" or pole-changing switch, the most common or successful form of which consisted of a rotatable brush-mounting on the generator, so designed that the friction of the commutator would drag the mounting around through 180 electrical degrees and thus reverse the positive and negative rushes when the direction of rotation reversed.

In my large, truck-mounted, axle-driven generator, this practice of utilizing a pole changer or "reverser" could not be followed, for several reasons. In the first place, my brush leads must carry 370 amperes requiring a large cable which is too stiff to permit the brushes to be shifted 180° by any amount of friction which would be available. In the second place, the amount of jarring to which my generator is subjected, by reason of its being mounted directly on the axle or truck, as distinguished from the spring-mounted car-body, is so terrific that no reverser or polarity-changing switch was known or could be designed to conveniently and safely perform this function on my generator.

To overcome these difficulties, I have added an exciter on the same shaft with my generator, and preferably an exciter of special design to have a high remanence, so that when the direction of rotation reverses, the exciter voltage, due to its remanent magnetism, will also reverse, but by reason of the high remanence of the exciter, the exciter voltage will be high enough to overcome the remanent magnetism of the generator and build up a generator field in the reversed direction so that the generator voltage will be in the same direction notwithstanding the reversal of its rotation. Exciters have not been used on axle-generator storage-battery systems heretofore because of the ready availability of the storage battery as a source of excitation current for the generator, and because of the inexpensiveness and satisfactory operation of the "reversers" or pole-changing devices heretofore utilized. My invention consists in the utilization of an exciter in this combination, and in the special design of the exciter to perform the double function of supplying an exciting current for the generator and reversing the polarity of the generator field with respect to the generator brushes when the direction of rotation reverses, so that the generator voltage is always in the same direction.

With the foregoing and other objects in view, my invention consists in the circuits, apparatus, systems and methods hereinafter described and claimed and illustrated in the accompanying drawing in which:

Figure 1 is a diagrammatic view of circuits and apparatus embodying my invention in a preferred form.

Fig. 2 is a longitudinal sectional view through my generator and exciter, and

Fig. 3 is an elevational view of my generator aggregate, with an indication of its position or mounting on a car truck.

As shown in Fig. 1, my invention is shown applied to an electric supply system for a railway car comprising a storage battery 4, such, for example, as a 1000 ampere-hour, 16-cell, 32-volt battery which floats across a direct-current bus 5. Current is supplied to the bus 5 by an axle-driven generator 6 which is shown schematically as being driven from the car axle 7, the actual driving connections, as shown in Fig. 3, including gearing 8 as described and claimed in the aforementioned Brecht application. In one application of my invention I utilize a 15-kilowatt generator 6 having a maximum voltage of 40 volts.

Mounted on the generator shaft 9 is an exciter 10, the armature of which is permanently connected to the generator field winding 11. The voltage of the exciter is controlled by any suitable voltage regulator 12 so as to maintain a substantially constant voltage on the generator 6. The particular voltage regulator shown is that which constitutes the subject-matter of an application of H. C. Krapf and J. O. Sherrard, Serial No. 621,135, filed July 7, 1932, assigned to the Westinghouse Electric and Manufacturing Company.

Means are also provided for connecting the generator 6 to the direct-current bus 5 when the generator voltage is sufficiently high to enable the generator to supply current to the bus and for disconnecting the generator from the bus before the generator voltage falls so low as to cause a material reverse-current flow from the bus to the generator. For this purpose, some sort of reverse-current switch or relay 14 is necessary. If desired, the relay contacts 15 may be utilized to control a special, heavy-duty, electromagnetic contactor 16, the contacts 17 of which actually make and break the generator-current circuit, thereby reducing the duty on the reverse-current switch contact 15. The particular reverse-current switch shown in the drawing constitutes the subject-matter of an application of Donald W. Exner, Serial No. 621,224, filed July 7, 1932, assigned to the Westinghouse Electric and Manufacturing Company.

The direct-current bus 5 may be utilized to supply a lighting circuit 19, through a suitable voltage regulator 20 to compensate for the difference between the battery discharge and the battery-charging voltage, and it also may be utilized to supply current to a heavy-duty power load, as indicated by the feeder 21, which may be utilized to supply an air-conditioning equipment or the like.

The physical structure of my generator and exciter is shown in Fig. 2. The exciter armature core 23 is pressed on an extension of the generator shaft 9. The exciter stator member comprises a barrel-like frame or yoke member 24 which is a casting made of high-remanence steel, as indicated by legend in Fig. 2. Such steel is a steel having more than the usual amount of carbon in it. The high-remanence quality may be also increased by not annealing the casting, so that I obtain an effect of some temper in the steel and thus a high-remanence. The exciter field member is provided with two pole pieces 25 which may be composed of one-sixteenth inch punchings, which need not be of special steel, because the amount of magnetomotive force consumed in the pole pieces is quite small compared to the magnetomotive force consumed in the yoke member 24, so that the latter supplies most of the remanent magnetism in any event.

The end of the generator 6, opposite to the exciter 10 which has just been described, is provided with a pinion 27 and the end of the generator frame 28 is provided with bolt or other means 29 for bolting or securing the generator to the gear unit 8 (Fig. 3). The end of the generator frame adjacent to the exciter is in the form of a removable end bell or bracket 31, and the exciter frame is bolted to this bracket, as indicated at 32. This end bracket 31 to which the exciter frame is bolted is made either of special high-remanent steel or of non-magnetic material such as non-magnetic iron or a non-magnetic brass alloy, preferably the latter, so that it will not magnetically short-circuit the remanent or residual magnetism in the yoke member 24 of the exciter. The other end of the exciter is closed by an aluminum end bell or housing 34.

As a further means for causing the exciter to have a higher remanent magnetism than the generator, I prefer to use as few poles as possible in the exciter, and more poles in the generator than in the exciter, so as to increase the length of the magnetic path between successive poles in the exciter, thus increasing the amount of remanent magnetism that may be retained in the magnetic circuit. I accordingly utilize a two-pole exciter and a four-pole generator, as indicated by legends in Fig. 1, thus helping to provide a higher coercive force and a higher residual magnetism in the exciter. In an actual design which probably provides a rather considerable margin of safety in the way of residual magnetism in the exciter, I obtain a residual voltage of about 6 volts on the exciter and about 1½ volts on the generator.

As a result of the above-described construction, when the direction of rotation of the generator-exciter aggregate reverses, the excitation of both the generator and the exciter, at first, remains the same as it was before the reversal of rotation, but the higher remanent magnetism of the exciter causes the exciter voltage to build up quicker than the generator voltage. At a very low speed, the exciter voltage, which has reversed, with the reversal of direction of rotation, is sufficiently high to cause the exciter current to reverse the field in the generator, overcoming the remanent magnetism therein, and thus starting to build up a flux in the reverse direction in the generator, which, in conjunction with the reversal of the direction of rotation, causes the generator polarity to build up in the same direction as before the change in the direction of rotation. The main exciter field windings, illustrated as comprising three parts 36, 36' and 36'', are energized from the generator terminals, as indicated in Fig. 1, and are thus excited in the same polarity as before the reversal of rotation, thus adding to the remanent magnetism of the exciter and building up the exciter voltage still higher. I have thus avoided the necessity for a "reverser" or pole-changing switch on the main generator 6.

Another means for securing, or helping to secure, the maintenance of a constant direction of magnetic flux in the exciter, regardless of the direction of rotation, is shown in Fig. 1, in the form of an auxiliary or "teaser" winding 38 on the exciter, which may be utilized either as an auxiliary device to assist the special steel construction, or as a substitute device to be utilized in place of the special exciter frame construction, although it is not necessary in all designs and I have been able to produce a very conservative construction, with an ample margin of safety as above outlined, without utilizing this "teaser" winding, or with its circuit opened as by means of a switch 40, (Fig. 1). The "teaser" winding, if utilized, is connected permanently across the battery terminals of the direct-current bus 5, and it has such a high resistance that it draws only a negligibly small current from the battery 4. Its effect is to ensure that the exciter voltage shall build up in a reversed direction when the direction of rotation is reversed.

I claim as my invention:

1. In a railway vehicle, the combination with an axle-driven, direct-current generator, of an axle-driven exciter therefor, said exciter having its main field windings energized at all times from the generator armature, the exciter main-field-winding connection to the generator armature being unaffected by the direction of rotation, and means for causing the exciter field flux to build up always with the same polarity of excitation regardless of the direction of rotation, said means comprising a magnetizable field frame of the exciter composed of a material having a higher remanence than the magnetizable field frame of the generator, said means further comprising an exciter construction having only two poles and a generator construction having more than two poles, and said means still further comprising a small-current teaser coil on the exciter field frame and a battery for constantly energizing said teaser coil so as to provide an excitation only large enough to positively insure that the exciter will build up with the proper direction of excitation regardless of the direction of rotation.

2. In a railway vehicle, the combination with an axle-driven, direct-current generator, of an axle-driven exciter therefor, said exciter having its main field windings energized at all times from the generator armature, the exciter main-field-winding connection to the generator armature being unaffected by the direction of rotation, and means for causing the exciter field flux to build up always with the same polarity of excitation regardless of the direction of rotation, said means comprising a magnetizable field frame of the exciter composed of a material having a higher remanence than the magnetizable field frame of the generator, and said means further comprising an exciter construction having only two poles and a generator construction having more than two poles.

3. In a railway vehicle, the combination with an axle-driven, direct-current generator, of an axle-driven exciter therefor, said exciter having its main field windings energized at all times from the generator armature, the exciter main-field-winding connection to the generator armature being unaffected by the direction of rotation, and means for causing the exciter field flux to build up always with the same polarity of excitation regardless of the direction of rotation, said means comprising a magnetizable field frame of the exciter composed of a material having a higher remanence than the magnetizable field frame of the generator, and said means still further comprising a small-current teaser coil on the exciter field frame and a battery for constantly energizing said teaser coil so as to provide an excitation only large enough to positively insure that the exciter will build up with the proper direction of excitation regardless of the direction of rotation.

4. In a railway vehicle, the combination with an axle-driven, direct-current generator, of an axle-driven exciter therefor, said exciter having its main field windings energized at all times from the generator armature, the exciter main-field-winding connection to the generator armature being unaffected by the direction of rotation, and means for causing the exciter field flux to build up always with the same polarity of excitation regardless of the direction of rotation, said means comprising an exciter construction having only two poles and a generator construction having more than two poles, and said means still further comprising a small-current teaser coil on the exciter field frame and a battery for constantly energizing said teaser coil so as to provide an excitation only large enough to positively insure that the exciter will build up with the proper direction of excitation regardless of the direction of rotation.

5. In a railway vehicle, the combination with an axle-driven, direct-current generator, of an axle-driven exciter therefor, said exciter having its main field windings energized at all times from the generator armature, the exciter main-field-winding connection to the generator armature being unaffected by the direction of rotation, and means for causing the exciter field flux to build up always with the same polarity of excitation regardless of the direction of rotation, said means including an exciter construction having only two poles and a generator construction having more than two poles.

6. In a railway vehicle, the combination with an axle-driven, direct-current generator, of an axle-driven exciter therefor, said exciter having its main field windings energized at all times from the generator armature, the exciter main-field-winding connection to the generator armature being unaffected by the direction of rotation, and means for causing the exciter field flux to build up always with the same polarity of excitation regardless of the direction of rotation, said means comprising a small-current teaser coil on the exciter field frame and a battery for constantly energizing said teaser coil so as to provide an excitation only large enough to positively insure that the exciter will build up with the proper direction of excitation regardless of the direction of rotation.

7. In combination, a main dynamo-electric machine and an exciter therefor, said exciter being mounted on the same shaft as said main machine, characterized by said main machine having a relatively non-magnetizable end bracket on the end adjacent to the exciter, and the exciter having a high-remanence steel, field yoke-member secured to said end bracket.

8. In combination, a main dynamo-electric machine and an exciter therefor, said exciter being mounted on the same shaft as said main machine, characterized by said main machine having a relatively non-magnetizable end bracket on the end adjacent to the exciter, and the exciter having a high-remanence steel, field yoke-member secured to said end bracket, said exciter also having a relatively non-magnetizable end bracket on its end opposite to said main machine.

9. In combination, a main dynamo-electric machine and an exciter therefor, said exciter being mounted on the same shaft as said main machine, characterized by said main machine having a separate end bracket on the end adjacent to the exciter, and the exciter having a high-remanence steel, field yoke-member secured to said end bracket, said end bracket being of a special material which will give the effect of a high magnetic reluctance to the high-remanence field-flux of the exciter at standstill.

10. In combination, a direct-current generator adapted to be rotated in either direction, and an exciter therefor, said exciter being mounted on the same shaft as said main machine and having field windings excited solely from the generator armature, characterized by said main machine having a relatively non-magnetizable end bracket on the end adjacent to the exciter, and the exciter having a high-remanence steel, field yoke-member secured to said end bracket.

11. In combination, a direct-current generator adapted to be rotated in either direction, and an exciter therefor, said exciter being mounted on the same shaft as said main machine and having field windings excited solely from the generator armature, characterized by said main machine having a relatively non-magnetizable end bracket on the end adjacent to the exciter, and the exciter having a high-remanence steel, field yoke-member secured to said end bracket, said exciter also having a relatively non-magnetizable end bracket on its end opposite to said main machine.

12. In combination, a direct-current generator adapted to be rotated in either direction, and an exciter therefor, said exciter being mounted on the same shaft as said main machine and having field windings excited solely from the generator armature, characterized by said main machine having a separate end bracket on the end adjacent to the exciter, and the exciter having a high-remanence steel, field yoke-member secured to said end bracket, said end bracket being of a special material which will give the effect of a high magnetic reluctance to the high-remanence field-flux of the exciter at standstill.

CHARLES F. JENKINS.